(12) United States Patent
Kowalski

(10) Patent No.: US 9,438,529 B1
(45) Date of Patent: Sep. 6, 2016

(54) COMPUTING PROCESS ANALYSIS BY METRICS PROFILING

(71) Applicant: Amazon Technologies, Inc., Seattle, WA (US)

(72) Inventor: Marcin Piotr Kowalski, Cape Town (ZA)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 14/497,152

(22) Filed: Sep. 25, 2014

(51) Int. Cl.
G06F 9/455 (2006.01)
H04L 12/911 (2013.01)
H04L 12/26 (2006.01)

(52) U.S. Cl.
CPC .......... H04L 47/70 (2013.01); G06F 9/45533 (2013.01); H04L 43/08 (2013.01)

(58) Field of Classification Search
CPC .................................................. G06F 9/45533
USPC ....................................................... 718/1–108
See application file for complete search history.

(56) References Cited

U.S. PATENT DOCUMENTS

| | | | | |
|---|---|---|---|---|
| 7,689,394 B2 * | 3/2010 | Furem | ........... | E02F 9/267 703/8 |
| 2003/0208580 A1* | 11/2003 | Presley | ........... | G06F 9/4887 709/223 |
| 2005/0120104 A1* | 6/2005 | Boon | ........... | G06F 9/4881 709/223 |
| 2006/0200821 A1* | 9/2006 | Cherkasova | ........... | G06F 11/3423 718/1 |
| 2008/0028411 A1* | 1/2008 | Cherkasova | ........... | G06F 9/5027 718/104 |
| 2011/0083131 A1* | 4/2011 | Pirzada | ........... | G06F 9/5077 718/1 |

OTHER PUBLICATIONS

Iosup, Alexandru, et al. "Performance analysis of cloud computing services for many-tasks scientific computing." Parallel and Distributed Systems, IEEE Transactions on 22.6 (2011): pp. 931-945.*
Li, Xinhui, et al. "The method and tool of cost analysis for cloud computing." Cloud Computing, 2009. CLOUD'09. IEEE International Conference on. IEEE, 2009. pp. 93-100.*
Alhamad, M., Dillon, T., & Chang, E. (Apr. 2010). Conceptual SLA framework for cloud computing. In Digital Ecosystems and Technologies (DEST), 2010 4th IEEE International Conference on (pp. 606-610). IEEE.*

* cited by examiner

Primary Examiner — Satish Rampuria
(74) Attorney, Agent, or Firm — Baker & Hostetler LLP

(57) ABSTRACT

A computing resource of a provider network is scheduled to undergo a process. During execution of the process, data associated with the process is monitored. An expected profile of the monitored data during execution of the process is determined. The expected profile is determined based on the type of the computing resource. Based on a comparison between the monitored data and the expected profile, a determination is made as to progress of the process.

18 Claims, 13 Drawing Sheets

COMPUTING PROCESS ANALYSIS BY METRICS PROFILING

BACKGROUND

A data center is a facility that houses computer systems and various networking, storage, and other related components. Data centers may, for example, provide computing services to businesses and individuals as a remote computing service or to provide "software as a service" (e.g., cloud computing). To facilitate utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner. Resources, such as virtual machines, may be launched, terminated, or otherwise transitioned in their operational state.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Embodiments of systems and methods are described for providing, by a provider network such as a data center, computing resources such as virtual instances, and use second order measurements to track progress for processes associated with the computing resources using observed metric data. Many processes, such as the launch of a new virtual instance, are black box processes where status of the progress of the process is not provided and where it is difficult to track such progress. It may thus be difficult to determine when a process has sufficiently progressed so as to be useful, or if the process has not been successful and must be terminated or reinitiated. For example, after powering on a laptop computer, the computer must first go through a boot and initialization process before the computer is actually usable by the user. This typically involves running through the boot and initialization process until a user desktop is generated and the user can begin to select and perform actions. Typically, until the user desktop is generated, a display may be provided indicating that the computer is powered on. However, it is difficult or impossible for the user to determine the progress of the computer toward reaching a usable state.

Examples of metric data include CPU cycles, data bytes read and written, disk accesses, and input/output (I/O) operations. Based on the observation that profiles of a metric are relatively deterministic for a given computing resources, a determination as to progress for the processes may be made to varying levels of detail. Determinations can then be made regarding failure or retry cycles. For example, a computing resource associated with a customer of the provider network may be scheduled to undergo a transition, such as a launch or termination. The provider network may measure and monitor observable metric data. The provider network may also determine an expected metric profile based on the specific computing resource. Based on comparison with the expected provide, a determination can be made pertaining to the progress of the process. The provider network may also notify a customer as to the progress of the process.

The customer may be notified in various ways. For example, the customer may be provided with a message notification that a requested computing resource is available, or that the computing resource is being reinitialized.

Figure 1:
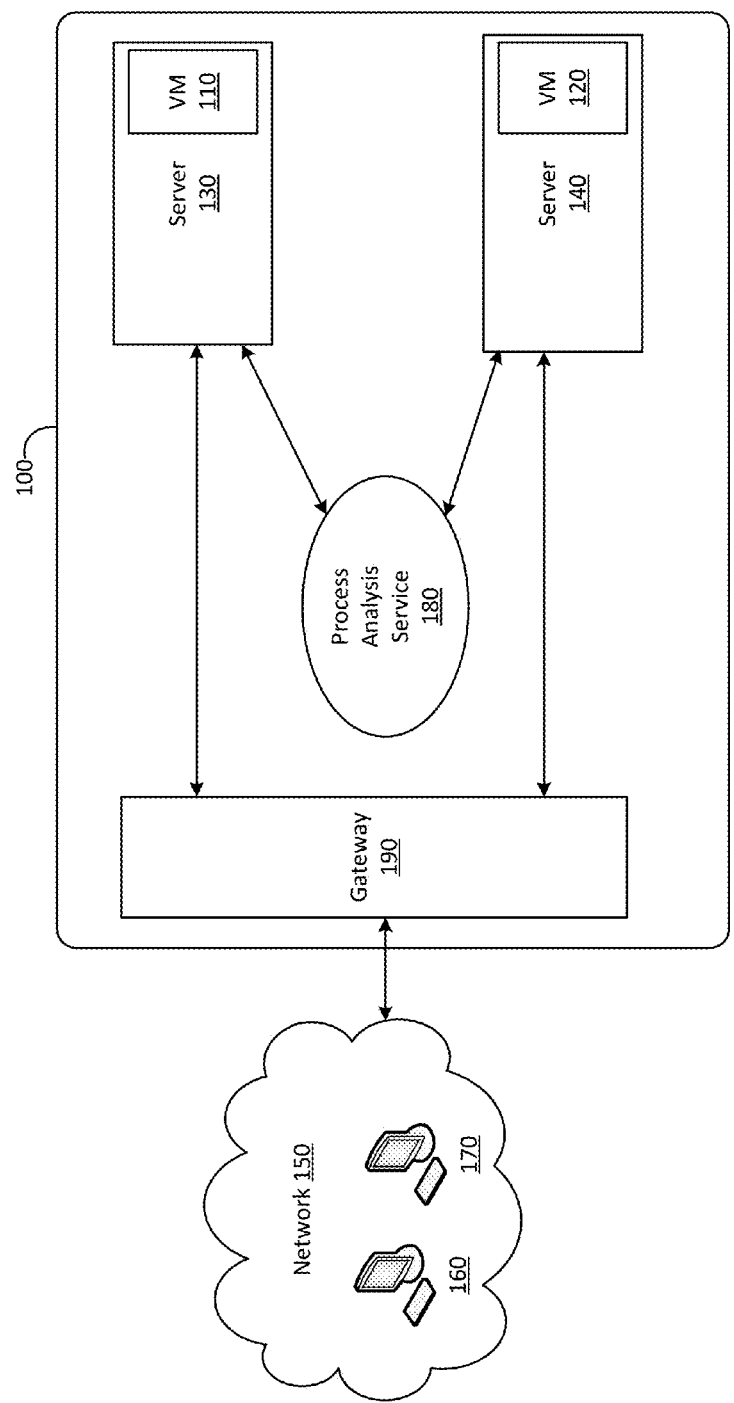
FIG. 1 is a diagram illustrating a mechanism for analyzing a process by metric profiling in accordance with the present disclosure.

FIG. 1 is a diagram illustrating a system 100 including functionality for analyzing a process by metric profiling in accordance with the present disclosure. Referring to FIG. 1, system 100 may include virtual machine instances 110 and 120 that may execute, for example, on one or more server computers 130 and 140. It will be appreciated that some embodiments may involve additional virtual machine instances that may be instantiated on additional server computers in system 100.

FIG. 1 also illustrates a public network 150 that may include one or more computing devices such as computers 160 and 170. According to one embodiment, virtual machine instance 110 may be configured to provide computing services to a computer user (not shown) of public network 150 via a gateway 190 and computers 160 and 170. For example, virtual machine instance 110 may provide a set of remote access enterprise applications to a group of users who may, for example, be employees of an enterprise customer.

A customer, user, administrator, or any computing resource in system 100 may request a resource instance with a particular software configuration. In one embodiment, a process analysis service 180 may be provided that receives or accesses metric data for computing resources. The metric data may be received or accessed during processes such as a boot and load process. The requested virtual resource can be provisioned by system 100 and process analysis service 180 may be configured to interact with the resource instance or a data store that stores metric data associated with computing resources. For example, an instance manager (e.g., a hypervisor or a Dom0) can identify virtual instances that are to be launched and report a list of the instances to the process analysis service 180. In an embodiment, the process analysis service 180 may measure and monitor observable metric data. The process analysis service 180 may also determine an expected metric profile based on the specific computing resource. Based on comparison with the expected provide, a determination can be made pertaining to the progress of the process. The process analysis service 180 may notify a customer as to the progress of the process. The process analysis may be requested directly by a customer of the data center, by an administrator of the data center, a provider or vendor of a particular software product, or any computing resource within the data center such as server 130. Server 130 may also send a request on behalf of itself or on behalf of other servers.

Various aspects of the disclosure are now described with regard to certain examples and embodiments, which are intended to illustrate but not to limit the disclosure. It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein; including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

In some cases a customer's resource, such as a computing instance, may be launched after the instance has been allocated, but the customer may not be able to determine when the launched instance is actually available in a meaningful way, or if there is a problem with the initialization of the instance. Likewise, a running instance may be scheduled for some other process, such as termination, but in a similar way there may not be any internal monitoring of the process that allows an external observer to determine the progress of the process. As an example, when a customer has signed up for autoscaling, instances for that customer may be launched or terminated in a dynamic manner. However, in many cases customers or other users may wish to keep track of the progress of a process and make a more timely decision as to whether a process is ready for utilization or if a process needs to be terminated or restarted.

The principles described in the example embodiments may be a implemented for any opaque process where status information is not externally observable. In generally, such a process may be viewed as a black box where inputs and outputs may be monitored to identify a characteristic profile for the process without having to access data that is internal to the process. For example, such a process may include initialization of a new instance, database recovery, or termination of an instance. Externally observable events may include amount of data read, I/O operations per unit time (e.g., disk operations), and CPU cycles consumed. Such measurements may then be analyzed to track progress of the process.

In one embodiment, a number of common opaque processes may be analyzed to identify characteristic profiles based on the observable measurements. The characteristic profiles may be developed until they are relatively deterministic for a given process depending on the computing resource (e.g., a virtual computing instance with a defined CPU and storage capacity on a given platform). The measurements may be analyzed using various methods, such as standard deviation or a time-based graph.

Using the measurements and characteristic profiles, a status of the ongoing progress may be provided, such as providing an indication when and if the resource will go into a usable state. Furthermore, the progress may be monitored and the provider network may programmatically or manually determine if the process is proceeding as expected or if an intervention is required.

A provider network may provide a service for notifying customers of the status of a process for a resource, such as launch, terminate, or some other change of operational status. The notification may be used using a messaging service, for example.

The disclosed embodiments may be implemented for transitions other than launches and terminations. In general, a customer may be provided notifications whenever a significant process in the life cycle of a computing resource is scheduled to occur.

The customer may also be provided the ability to provide a notification to the provider network if, for example, the customer wishes to make modifications to the resource prior to taking further action for a failed process. For example, an instance launch may have been determined to have failed, and the customer may wish to modify the instance type prior to attempting a re-launch.

By providing notifications to customers in this way, customers may be able to more effectively and advantageously manage their computing resources. In one embodiment, notifications and/or status information may be provided to clients using an interface. In some embodiments, the notifications and/or status information may be provided via a programming interface. For example, the notifications may be reported to customers via application programming interfaces (APIs) in a status field. At least one of the APIs may be configured to receive electronic messages that encode identifiers indicative of requests for information pertaining to transitions. In response to receiving one of the electronic messages, an API may send electronic messages indicative of information pertaining to a current status of the transition. In one embodiment, a detailed status field may also be provided. This transition instance status information may be updated at various intervals. The transition status information may be machine-readable, human-readable, or both.

Some examples of possible transition information may include:

In progress—a process is in progress and proceeding per the expected characteristic profile;

Process completed—the process is completed and the requested resource is available for use;

Process failed—the process does not comply with the expected characteristic profile; and Repeat of process pending—the process will be re-attempted pending approval.

By providing the process status information, a customer may respond with appropriate actions to ensure that the customer's resources will be prepared for the pending transition.

The transition status information can be provided using a number of notification methods. For example, notifications can be pushed to a client by using messaging mechanisms such as e-mail messaging. Notifications can also be provided using programmatic methods such as providing data via a programming interface.

Figure 2:
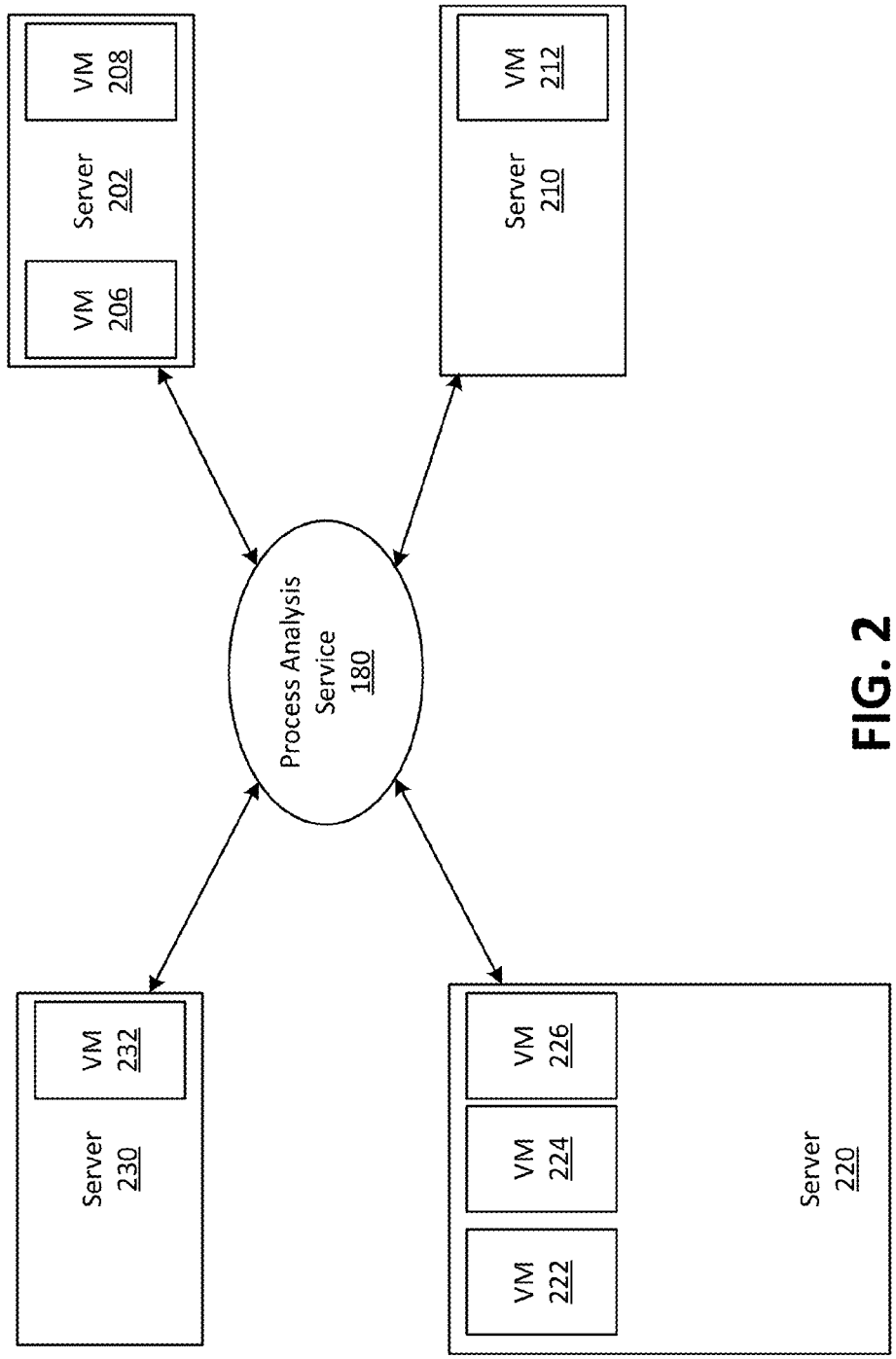
FIG. 2 is a diagram illustrating an example computing system that may be used in some embodiments.

FIG. 2 illustrates an example computing environment in which the embodiments described herein may be implemented. Referring to the figure, server computers 202, 210, 220, and 230 may communicate with a process analysis service 180 so that the progress of an opaque process can be monitored. The tracked measurements may be stored in a data store on one of the server computers 202, 210, 220, and 230, or in a data store (not shown) that is part of the process analysis service 180. Process analysis service 180 may in some embodiments correspond to process analysis service 180 as depicted in FIG. 1. Server computer 202 may host virtual machine instances 206 and 208. Similarly, server computer 210 may host virtual machine instance 212; server computer 220 may host virtual machine instances 222, 224, and 226; and server computer 230 may host virtual machine instance 232.

Server computer 202 may send an indication to process analysis service 180 that virtual machine 232 will be launched, and in response process analysis service 180 may initiate a process monitoring function (not shown). Process analysis service 180 may interact with server computer 202 to access or receive data pertaining to the monitored process. Furthermore, process analysis service 180 may generate a process identifier based on the monitored process. In another configuration, server 202 may generate a record of monitored data for virtual machine instance 206 or 208 and send the record to process analysis service 180 for storage.

In some embodiments, the request for the configuration verification may be sent to process analysis service 180 from server computer 202 on behalf of one of the other server computers 210, 220, and 230. Process analysis service 180 may be implemented as a distributed system and can reside on one or more server computers and/or other computing resources in one or more data centers. Process analysis service 180 may in some embodiments be managed by a virtual machine monitor (VMM) or other management software executing in the data center. Process analysis service 180 may also execute on one or more virtual machines.

Figure 3:
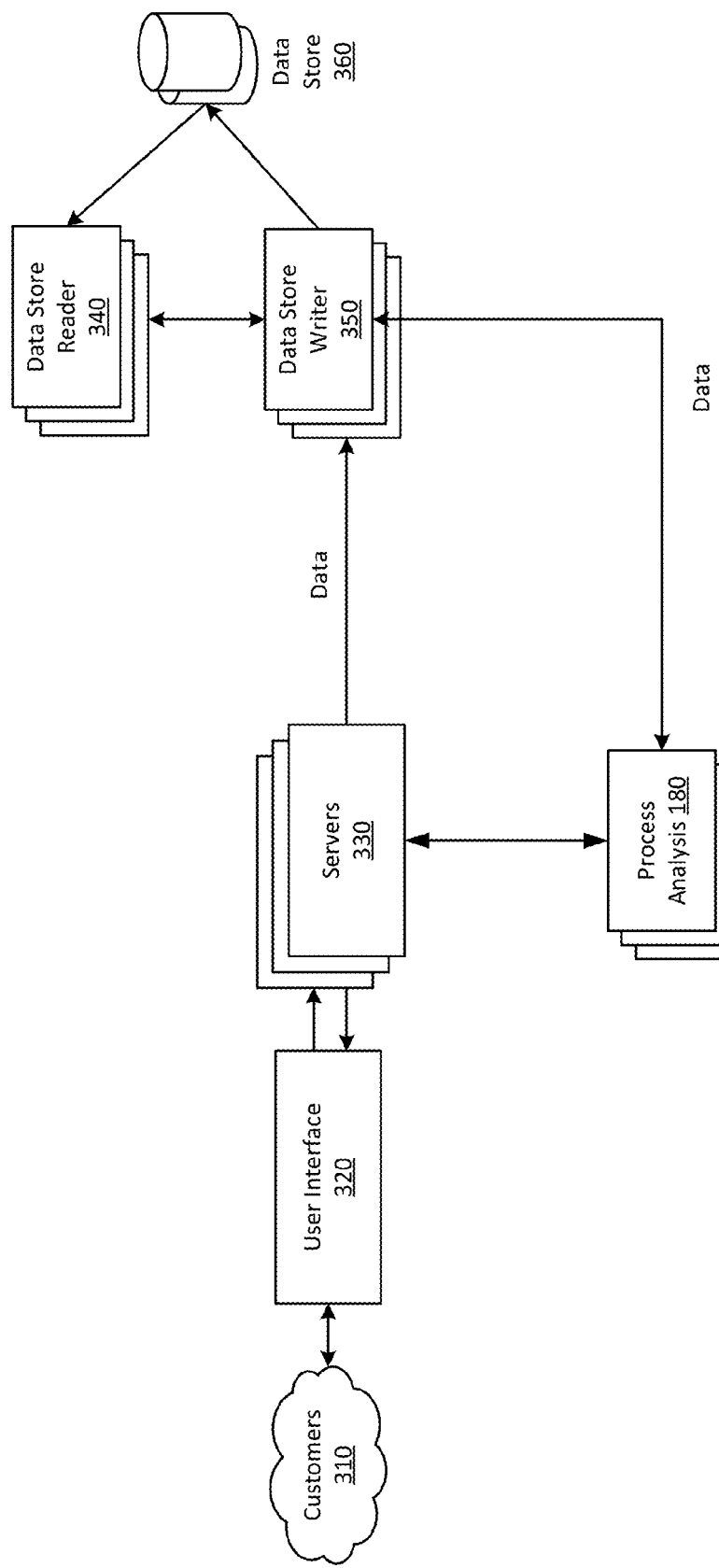
FIG. 3 is a diagram illustrating a system for providing process analysis in accordance with the present disclosure.

Referring to FIG. 3, illustrated is one example implementation of functionality associated with the process analysis service 180. The process analysis service 180 may access or cause access to various measurements and generate or cause the generation and storing of the measurements. Customers 310 of the service provider may access a user interface (UI) 320 for viewing the status of a process based on the measurements, and for requesting analysis and additional data. In some embodiments, the user interface 320 can be generated by functions implemented in software executing on one or more of the service provider's servers 330. Performance or metric data associated with customers 310 may be provided to a data store writer 350 that may store the data. A data store reader 340 may be configured to access the data store 360 and retrieve data based on requests from process analysis service 180 or for other purposes.

Figure 4:
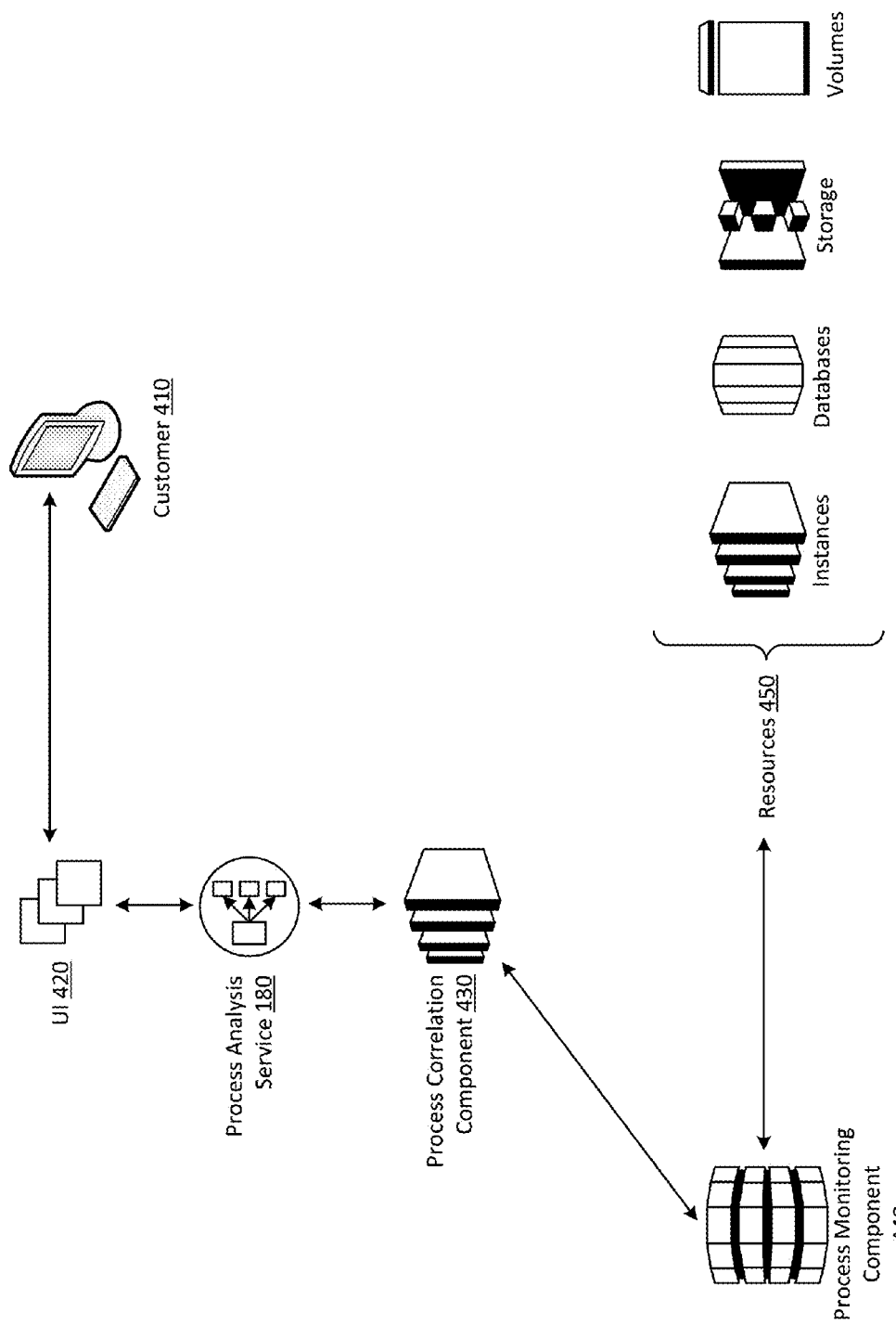
FIG. 4 is a diagram illustrating a system for providing process analysis in accordance with the present disclosure.

Referring to FIG. 4, illustrated is another example of requesting process analysis in accordance with this disclosure. Referring to FIG. 4, a customer 410 may access a user interface (UI) 420 depicting services related to indications of progress related to a selected process of interest. User interface 420 may be generated that depicts one or more processes and related progress for the customer 410. Additional user interfaces may be provided based on requests from the customer for additional data. The user interface 420, as well as other user interfaces that may be used to present process analysis information to a user, may in some embodiments be generated by the service provider and sent to the user's display for rendering. In other embodiments, the user's computing device may include functionality to generate some or all portions of the user interface. For example, the user's web browser may include code for generating some of the graphics for rendering data received from the service provider. The service provider may receive the selection information from the user's computing device and provide the requested information. The user interface 420 may be generated or caused to be generated by process analysis service 180.

Process analysis service 180 may interact with a process correlation component 430. The process correlation component 430 may communicate with process monitoring component 440 to identify data that can be useful to measure the progress of a process of interest. The data may be continuously monitored and recorded for resources 450.

A service, such as process analysis service 180, may be configured to provide real-time or accumulated and/or archived monitoring of a customer's resources. The monitored resources may include instances of various types, such as reserved instances and on-demand instances. The monitored resources may also include other computing resources provided by the service provider such as storage services. The process analysis service 180 may provide metrics such as CPU utilization, data transfers, and disk usage activity. The process analysis service 180 may be made accessible via an API or a user interface that may be accessed via a web browser or other input mechanisms.

In some embodiments, the process analysis service 180 may monitor metrics automatically and the service provider may store monitored metric data for analysis. For example, the service provider may collect metadata for a number of pre-selected metrics at a predetermined frequency. Additional metrics may be provided at the same or different frequencies if requested by the service provider. It should be understood that the metrics may be provided for any of the computing resources provided by the service provider including load balancers, databases, storage, and the like. The process analysis service 180 may monitor load balancers for metrics, such as request count and latency, or storage resources for metrics, such as read/write latency, free-able memory, and available storage space. The process analysis service 180 may also monitor metrics generated by the customer's applications. A number of graphic indicators of metrics may be provided, such as tabular data and graphs.

When viewing the status of a process on a user interface, the customer may be provided graphics and text that may indicate a distinctive or characteristic profile that may be useful for extrapolating the progress of the process. For example, a customer may view CPU cycles for an instance during initial boot.

A customer's instances may have various properties, such as the software image that is running on them, the availability zone where the instance is located, the number of CPUs, the CPU speed, the available RAM, etc. Various measurements that may be indicative of the progress of a selected process may have characteristic profiles based on the properties of the instance, each of which may, alone or in combination with other profiles, indicate a correlation with the process of interest. In one embodiment, a function may be invoked that compares stored profiles for various instances with specific configurations. A process running on an instance may be assigned a correlation value if the observed profile exhibits a strong correlation to the stored and expected profile. The observed profile may also be assigned a higher correlation value based on how closely the observed profile matches the expected profile. In some embodiments, a graph indicative of the measurements may be used to determine progress toward a predetermined state. Additionally and optionally, the area under the graph may be calculated to determine if the sum of the measure over a selected period of time matches that of an expected profile.

The provider network may have existing systems for measuring various observable parameters and collecting and recording measurements. The disclosed systems may interact with such existing systems to access measurements. Different profiles may be generated and stored for various configurations for the computing resources. In some embodiments, expected profiles may be generated by projecting expected profiles based on a selected configuration. For example, if a second computing instance is instantiated on a set of resources, the expected profile may be projected to be proportionately reduced based on the configuration of the second instance and being instantiated using the same set of resources.

In some embodiments, the process analysis service 180 may initially analyze a predefined group of measurements that are more likely to indicate the progress related to a selected process for a customer's resources. The process analysis service 180 may also review measurement data for a previous process attempt.

In some embodiments, a failed process, as indicated by a failure to match an expected profile, may be analyzed to determine possible causes for the failure. When a plurality of measurements are identified as being potentially relevant to a selected process, the measurements can be linked as a bidirectional tree where links of the bidirectional tree may be formed based on correlation to the process as well as a causal relationship to the process.

In some embodiments, candidates for relevant measurements can be selected based on biasing to influence the selection. For example, data for an initial set of candidate measurements can be weighted to indicate relevance of the measurements to the process of interest. The weighting can be continuously updated to increase the likelihood of optimizing around the selected measurements. Biasing can indicate, for example, that some measurements are only relevant to specified processes while having no impact on other processes. The biasing can also be used to eliminate some processes from consideration.

The process analysis service 180 may be configured to determine which measurements are relevant for data collection. In some embodiments, the process analysis service 180 may implement a pattern classification system to identify relevant measurements and expected profiles. For example, the process analysis service 180 may include a learning system that may include a learning function to continuously learn which profiles are relevant to a selected process. In some embodiments, supervised learning may be incorporated where administrators of the provider network may classify observations made from a particular measurement and assign tags to the observations. The tags may be updated by the learning system to update relevance to the process of interest as new observations are made and assigned tags to the new observations.

In order to provide relevant results that are more likely to indicate correlations to the progress of a particular process, the most relevant measurements should be identified and tracked. However, the complexity of computing processes in an environment with hundreds or thousands of networked devices may preclude a deterministic and entirely predictable set of profiles. In some embodiments a heuristic model can be used to find satisfactory solutions that provide an acceptable confidence level in the results. Feedback from an initial round of analysis can be used to further refine an initial set of profile data.

In some embodiments, the measurements that are tracked for measuring progress of a process may be selected based on context. The process analysis service 180 may, for example, automatically select measurements related to the process that is selected.

The progress of the selected process may take any number of forms. In one embodiment, the results may be presented as a status bar. Additionally or alternatively, one or more graphs may be provided to indicate the specific measurements that are being tracked.

Figure 5A:
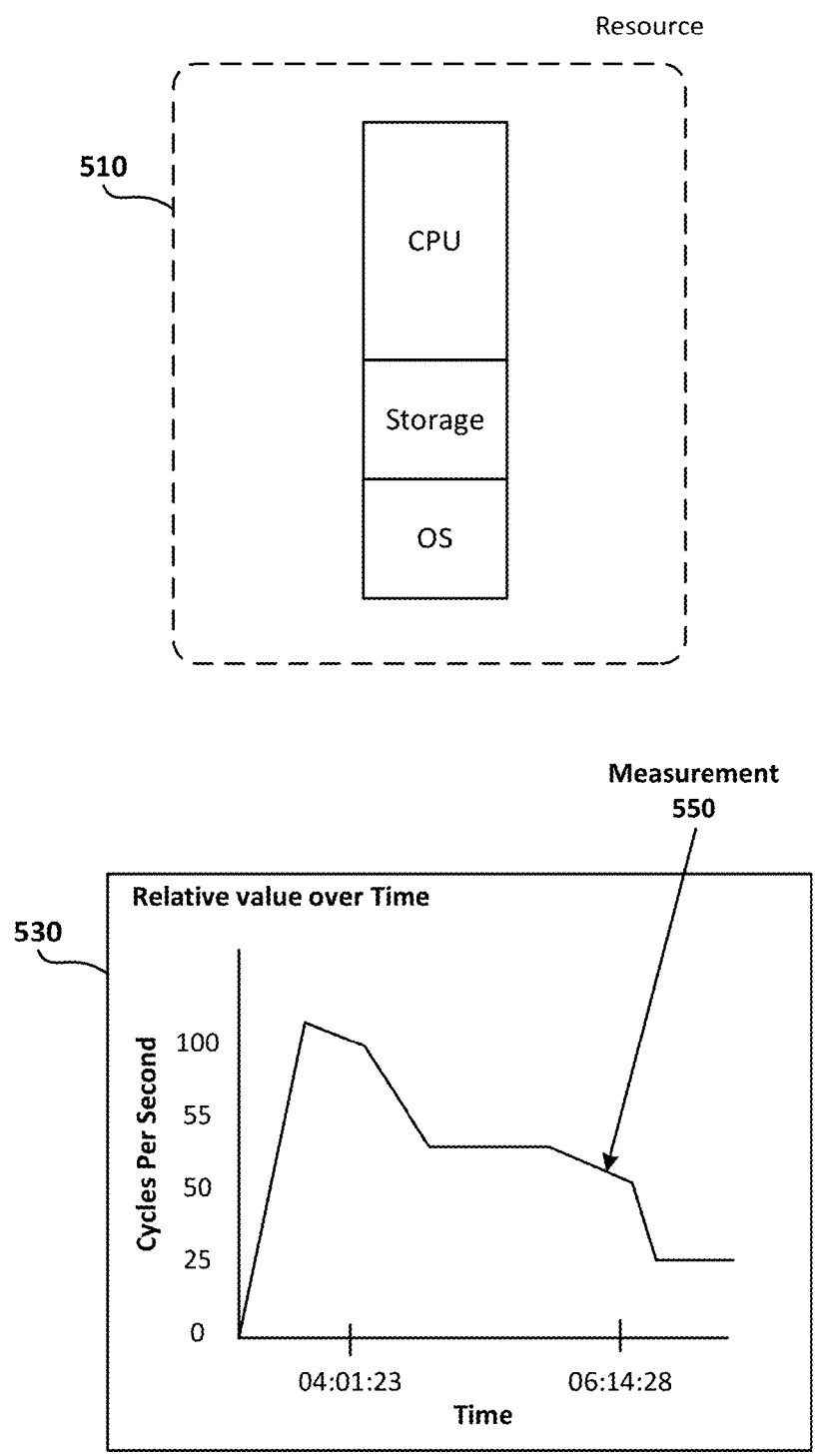
FIG. 5A is a diagram illustrating an example of providing process analysis in accordance with the present disclosure.
Figure 5B:
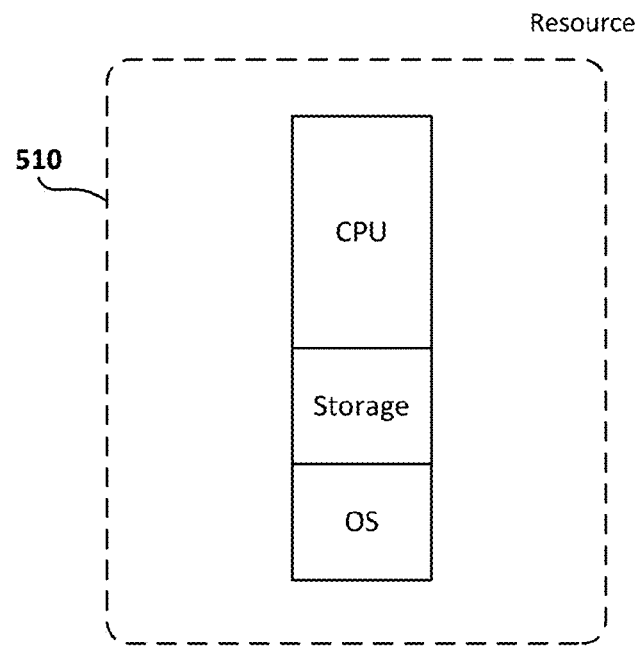
FIG. 5B is a diagram illustrating an example of providing process analysis in accordance with the present disclosure.
Figure 5B:
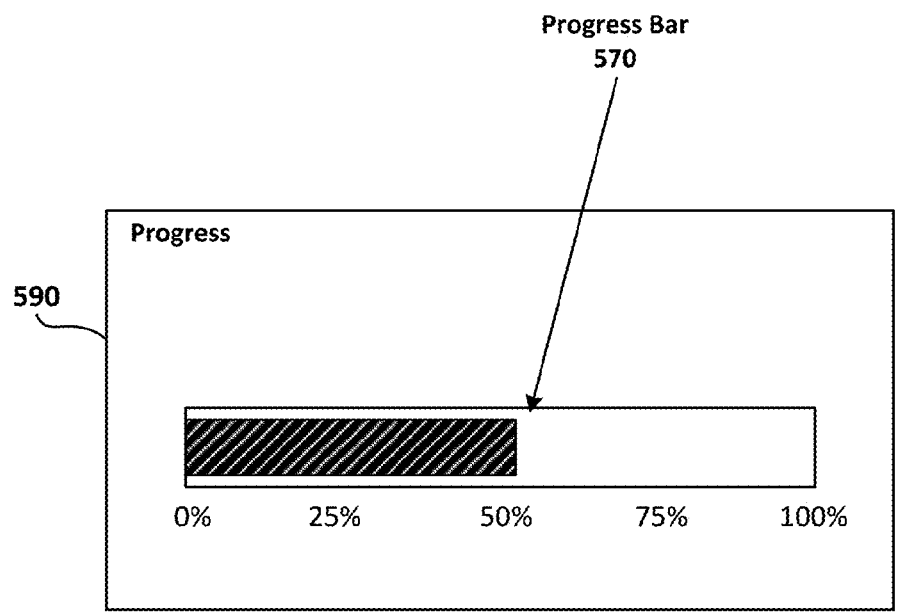
Figure 6:
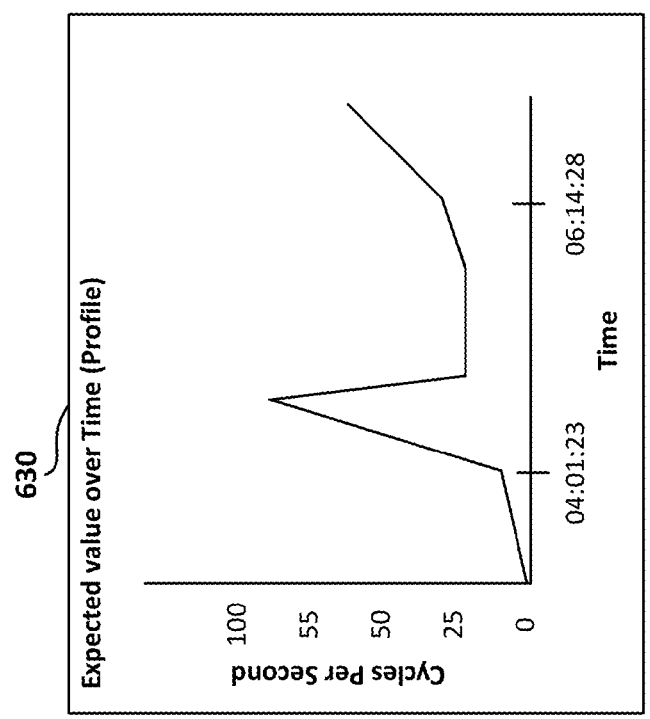
FIG. 6 is a diagram illustrating an example of providing process analysis in accordance with the present disclosure.
Figure 6:
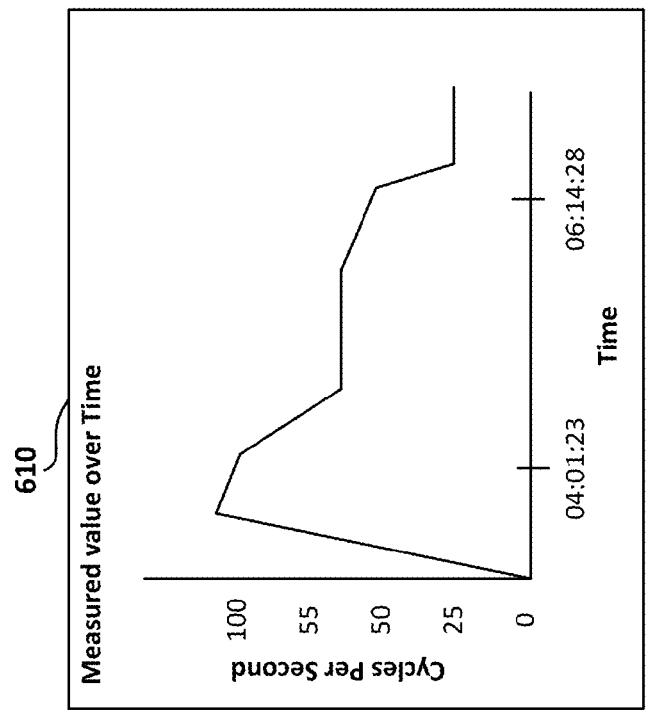

A user interface may be provided to allow access to the process analysis service 180. For example, a user interface as shown in FIGS. 5A, 5B, and 6 may be provided. Referring to FIG. 5A, illustrated is an example of requesting process status in accordance with this disclosure. Referring to FIG. 5A, a service provider may allocate a computer resource 510 to a customer (not shown) that can be a resource slot configured to host a computing instance. The instance may further be configured with a selected storage and CPU configuration, as well as an operating system and other configuration selections (not shown). The customer may be provided with a user interface depicting status with respect to the launch and boot of the instance up to a defined state, such as when the customer can utilize the instance. A user interface 530 may be generated that depicts a graphical representation for a measurement such as CPU cycles per unit time. The measurement 550 exhibits the currently observed profile. FIG. 5B shows an optional implementation where progress for a process associated with computing instance 510 is indicated by a progress user interface 590, where a progress bar 570 is shown indicating progress toward completion of the process. The measure of progress can be indicated using a relative measure such as percentage or a fraction. The determination of progress can be estimated by comparison with the currently observed measurements and the expected profile for the process with respect to the measurement.

Referring to FIG. 6, illustrated is an example of analyzing measurements to determine the progress of a process. The selection of a process of interest may cause process analysis service 180 of FIG. 1 to start one or more process analysis services to access and track measurements. In one embodiment, if the measured value shown in graph 610 is substantially different from the expected value shown in graph 630, then process analysis service 180 may generate an output indicating that the process is failed or running in an abnormal manner.

As discussed, the user can be provided a user interface for viewing results provided by the process analysis service 180. In one embodiment, a customer may utilize a user interface presented by the process analysis service 180 of FIG. 1 to request and view the progress of a process for a computing resource.

In some embodiments, an API or a programming interface sub-system may be provided for facilitating requests and data related to the progress of a process. The API may be configured to receive electronic messages that encode identifiers indicative of a selection of a process of interest. In response to receiving one of the electronic messages, the API may send second electronic messages indicative of information pertaining to measurements and/or status information pertaining to the process.

Figure 7:
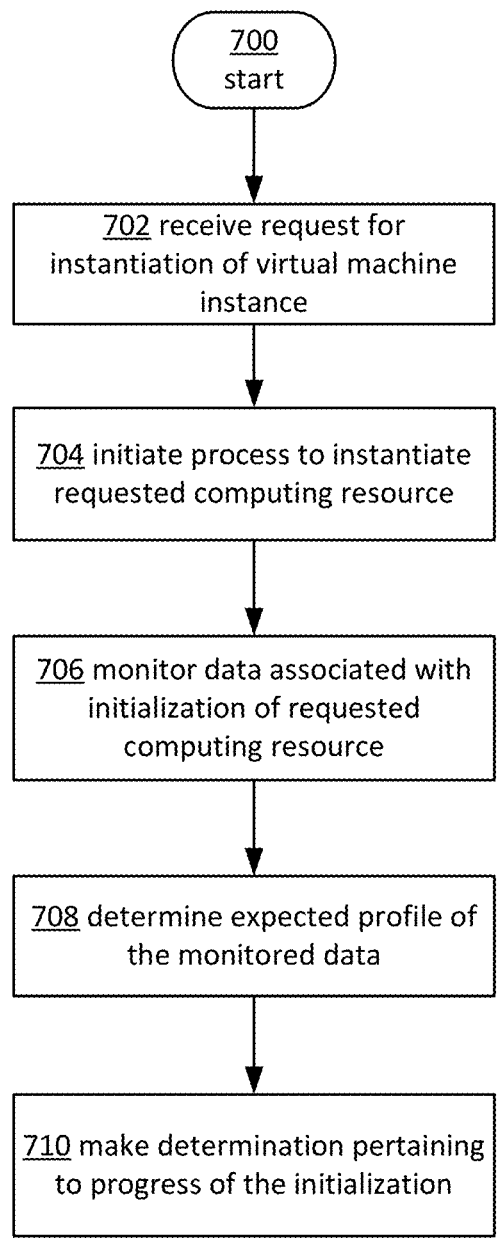
FIG. 7 is a flowchart depicting an example procedure for analyzing a process by metric profiling in accordance with the present disclosure.

FIG. 7 illustrates an example operational procedure for managing computing resources as described in this disclosure. In an embodiment, one or more elements of the described procedure may be provided by services such as a process analysis service 180 in FIG. 1. The operational procedure may be implemented in a system including one or more computing devices. The system may also include a memory having stored therein computer instructions that, upon execution by the system, perform one or more steps of the operational procedure. Referring to FIG. 7, operation 700 begins the operational procedure. Operation 700 may be followed by operation 702. Operation 702 illustrates receiving a request for instantiation of a virtual machine instance on one of the one or more computing devices. The computing resource may be associated with a customer of the provider network. Operation 702 may be followed by operation 704. Operation 704 illustrates in response to the request, initiating a process to instantiate the requested computing resource. Operation 704 may be followed by operation 706. Operation 706 illustrates during execution of the process, monitoring data associated with initialization of the requested computing resource to a predetermined operational state of the requested computing resource. In one embodiment, the data may include one or more of CPU cycles per unit time, data written and read per unit time, and input/output operations per unit time.

Operation 706 may be followed by operation 708. Operation 708 illustrates determining an expected profile of the monitored metric data during the instantiation process. The expected profile can be determined based at least in part on the requested computing resource. Operation 708 may be followed by operation 710. Operation 710 illustrates, based on a comparison between the monitored metric data and the expected profile, making a determination pertaining to progress of the instantiation process of the requested computing resource.

In some embodiments, a status message indicative of progress toward the predetermined operational state may be generated and provided. Additionally, success or failure of the instantiation process can be determined based on the comparison between the monitored metric data and the expected profile. The instantiation process can be terminated based on the determined probable success or failure. A probable cause for failure of the process may also be determined.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may, in some embodiments, be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor or another type of program configured to enable the execution of multiple instances).

A number of different types of computing devices may be used singly or in combination to implement the resources of the provider network in different embodiments including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 8:
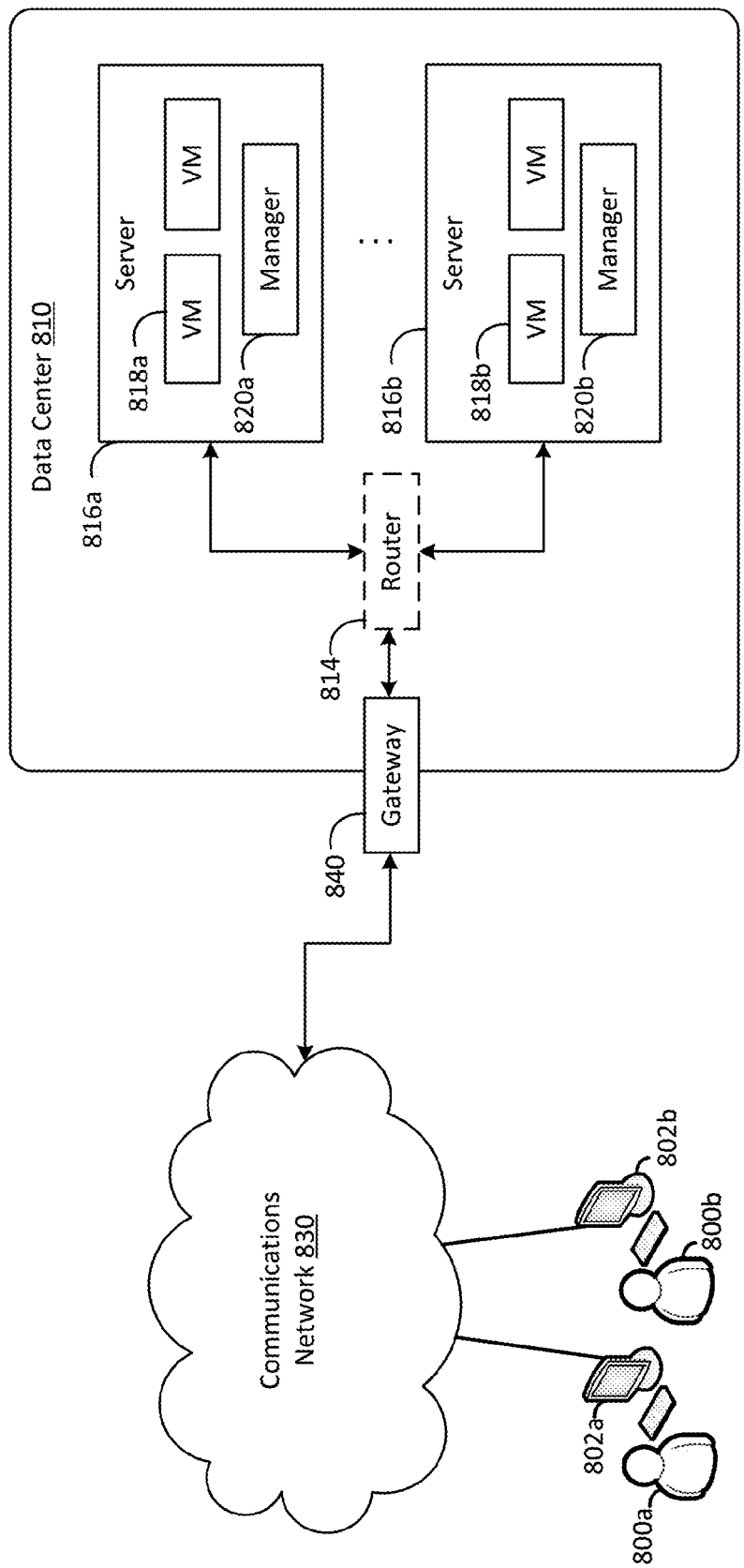
FIG. 8 is a diagram illustrating an example computing system that may be used in some embodiments.

FIG. 8 illustrates an example computing environment in which the embodiments described herein may be implemented. FIG. 8 is a diagram schematically illustrating an example of a data center 810 that can provide computing resources to users 800a and 800b (which may be referred herein singularly as "a user 800" or in the plural as "the users 800") via user computers 802a and 802b (which may be referred herein singularly as "a computer 802" or in the plural as "the computers 802") via a communications network 830. Data center 810 may be configured to provide computing resources for executing applications on a permanent or an as-needed basis. The computing resources provided by data center 810 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications including web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as web servers and/or one large processing resource as a database server, for example.

Data center 810 may include servers 816 that provide computing resources available as virtual machine instances 818a and 818b (which may be referred herein singularly as "a virtual machine instance 818" or in the plural as "the virtual machine instances 818"). The virtual machine instances 818 may be configured to execute applications, including web servers, application servers, media servers, database servers, and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMware® or other virtualization systems, may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 8, communications network 830 may, for example, be a publicly accessible network of linked networks and possibly operated by various distinct parties, such as the Internet. In other embodiments, communications network 830 may be a private network, such as, for example, a corporate or university network that is wholly or partially inaccessible to non-privileged users. Still in other embodiments, communications network 830 may include one or more private networks with access to and/or from the Internet.

Communication network 830 may provide access to computers 802. Computers 802 may be computers utilized by customers 800 or other customers of data center 810. For instance, user computer 802a or 802b may be a server, a desktop or laptop personal computer, a tablet computer, a wireless telephone, a personal digital assistant (PDA), an e-book reader, a game console, a set-top box, or any other computing device capable of accessing data center 810. User computer 802a or 802b may connect directly to the Internet (e.g., via a cable modem or a Digital Subscriber Line (DSL)). Although only two user computers 802a and 802b are depicted, it should be appreciated that there may be multiple user computers.

Computers 802 may also be utilized to configure aspects of the computing resources provided by data center 810. In this regard, data center 810 might provide a web interface through which aspects of its operation may be configured through the use of a web browser application program executing on user computer 802. Alternatively, a stand-alone application program executing on user computer 802 might access an application programming interface (API) exposed by data center 810 for performing the configuration operations. Other mechanisms for configuring the operation of the data center 810, including deploying updates to an application, might also be utilized.

Servers 816a and 816b (which may be referred herein singularly as "a server 816" or in the plural as "the servers 816") shown in FIG. 8 may be standard servers configured appropriately for providing the computing resources described above and may provide computing resources for executing one or more applications. In one embodiment, the computing resources may be virtual machine instances 818. In the example of virtual machine instances, each of the servers 816 may be configured to execute an instance manager 820a or 820b (which may be referred herein singularly as "an instance manager 820" or in the plural as "the instance managers 820") capable of executing the virtual machine instances. The instance managers 820 may be a virtual machine monitor (VMM) or another type of program configured to enable the execution of virtual machine instances 818 on server 816, for example. As discussed above, each of the virtual machine instances 818 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 810 shown in FIG. 8, a router 814 may be utilized to interconnect the servers 816a and 816b. Router 814 may also be connected to gateway 840, which is connected to communications network 830. Router 814 may manage communications within networks in data center 810, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 810 described in FIG. 8 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules.

Similarly, in some embodiments the functionality of some of the illustrated modules may not be provided and/or other additional functionality may be available.

The capacity of purchased computing resources provided by data center 810 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 810 can be scaled on-demand.

Auto scaling is one mechanism for scaling computing resources in response to increases or lulls in demand for the resources. Auto scaling allows customers of data center 810 to configure data center 810 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 810.

Data center 810 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, and provide cache warming logic specifying how an application cache should be prepared and other types of information. The deployment component utilizes the customer-provided configuration and cache warming logic to launch, configure and prime new instances of computing resources.

Operators of provider networks, such as those described above may, in some embodiments, implement a flexible set of resource reservation, control, and access interfaces for their clients. For example, a resource manager of the provider network may implement a programmatic resource reservation interface (e.g., via a website or a set of web pages) that allows clients to learn about, select, purchase access to, and/or reserve resource instances. In some of the various embodiments discussed below, where an entity, such as a resource manager, is described as implementing one or more programmatic interfaces such as a web page or an API, an interface manager subcomponent of that entity may be responsible for the interface-related functionality. In some embodiments, equivalent interface-related functionality may be implemented by a separate or standalone interface manager, external to the resource manager. Such an interface may include functionality to allow browsing of a resource catalog, provide details, and specifications of the different types or sizes of resources supported, the different reservation types or modes supported, pricing models, and so on.

In some embodiments, the provider network may support several different purchasing modes (which may also be referred to herein as reservation modes) such as long-term reservations, on-demand resource allocation, or spot-price-based resource allocation. Using the long-term reservation mode, a client may make, for example, a low, one-time, upfront payment for a resource instance, reserve the resource instance for a specified duration, such as a one- or three-year term, and pay a low hourly rate for the instance. In this case, the client may be assured of access to the reserved instance for the full term of the reservation.

Using on-demand mode, a client may pay for capacity by the hour (or some other appropriate time unit), without any long-term commitments or upfront payments. When using an instance obtained in on-demand mode, the client may be allowed to extend the allocation period as needed, and thus maintain client access to the instance until the client voluntarily relinquishes access (e.g., by terminating the instance). Similarly, in the case of a long-term reserved instance, a client may have uninterrupted access to the instance for the term of the reservation, and may at least in some embodiments renew the reservation to extend its access to the instance. Such instance allocations, in which the client controls how long it accesses a resource instance and when the instance is terminated, may be termed "uninterruptable" instance allocations, and the corresponding instances may be referred to as uninterruptible instances.

In contrast, some pricing modes may be associated with interruptible instance allocations. In the spot-price mode, a client may specify the maximum price per unit time that the client is willing to pay for a particular type of resource. If the client's maximum price exceeds a dynamic spot price determined at least in part by supply and demand, that type of resource may be provided to the client. In this case, the dynamic price spot price may be referred to as a market-based price or price level. In some embodiments, dynamically resizable pools of resource instances may be set aside for the different reservation types or modes—e.g., long-term reserved instances may be allocated from one pool, on-demand instances from another, and so on. Such a computing resource may be referred to as an interruptible instance allocation, an interruptible instance, a spot instance, or a computing resource with an interruptibility property.

During periods when the supply of the requested resource type exceeds the demand, the spot price may become significantly lower than the price for on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone are insulated from failures in other availability zones. For example, a failure in one availability zone may not be expected to result in a failure in any other availability zone. Thus in some embodiments, the availability profile of a resource instance may be independent of the availability profile of a resource instance in a different availability zone. Clients may thus be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Figure 9:
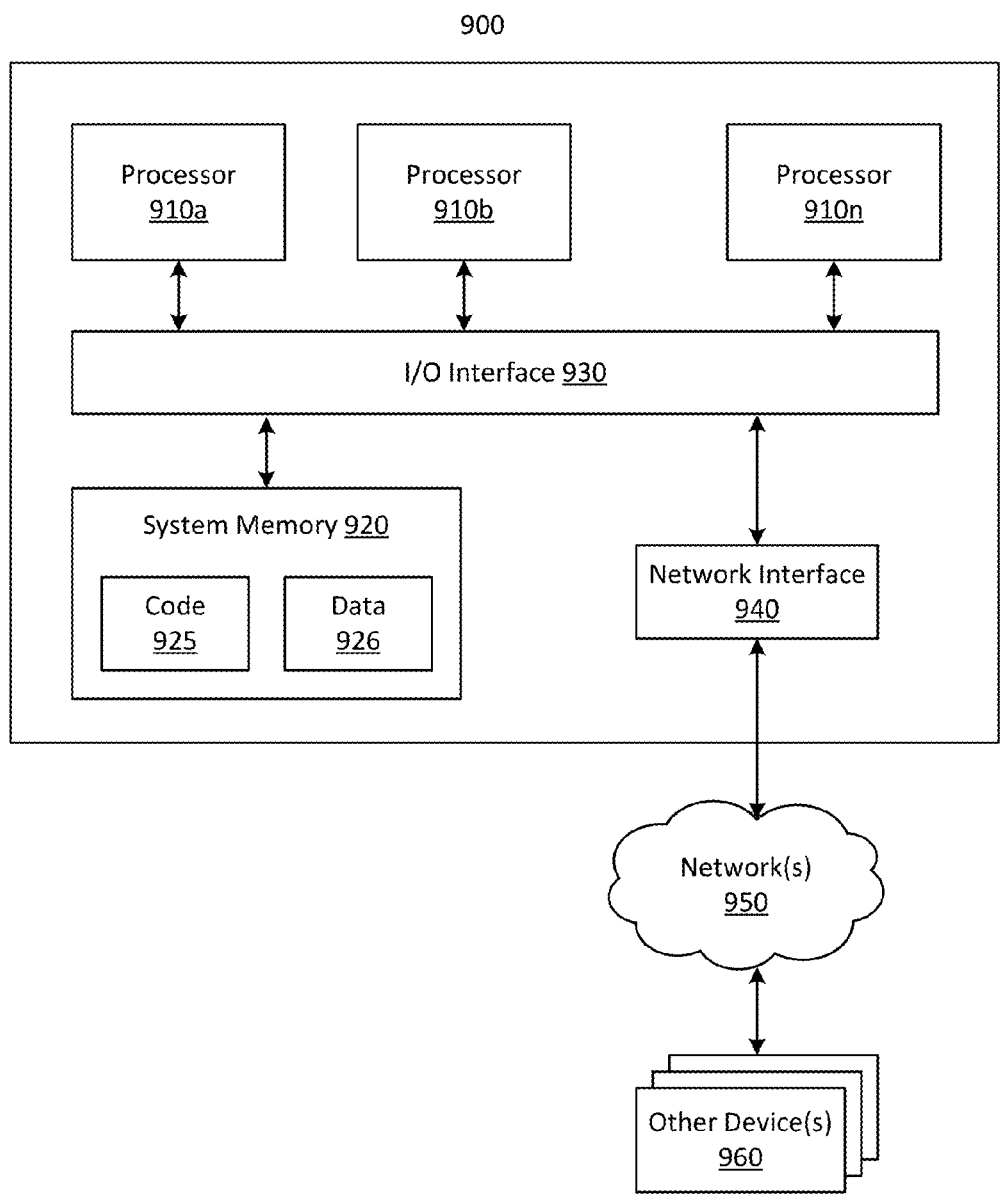
FIG. 9 is a diagram illustrating an example computing system that may be used in some embodiments.

In at least some embodiments, a server that implements a portion or all of one or more of the technologies described herein, including the techniques to implement the functionality of a process analysis service 180 may include a general-purpose computer system that includes or is configured to access one or more computer-accessible media. FIG. 9 illustrates such a general-purpose computing device 900. In the illustrated embodiment, computing device 900 includes one or more processors 910a, 910b, and/or 910n (which may be referred herein singularly as "a processor 910" or in the plural as "the processors 910") coupled to a system memory 920 via an input/output (I/O) interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 990, such as an interface to system memory 920, may be incorporated directly into processor 910.

Network interface 940 may be configured to allow data to be exchanged between computing device 900 and other device or devices 960 attached to a network or network(s) 950, such as other computer systems or devices as illustrated in FIGS. 1 through 9, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fibre Channel SANs or via any other suitable type of network and/or protocol.

In some embodiments, system memory 920 may be one embodiment of a computer-accessible medium configured to store program instructions and data as described above for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 900 as system memory 920 or another type of memory. Further, a computer-accessible medium may include transmission media or signals, such as electrical, electromagnetic, or digital signals, conveyed via a communication medium, such as a network and/or a wireless link, such as may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

The provider network may make instances available "on-demand," allowing a customer to select a number of instances of a specific type and configuration (e.g., size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

In the spot-price mode, a client could specify the maximum price per unit of time that the client is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 10:
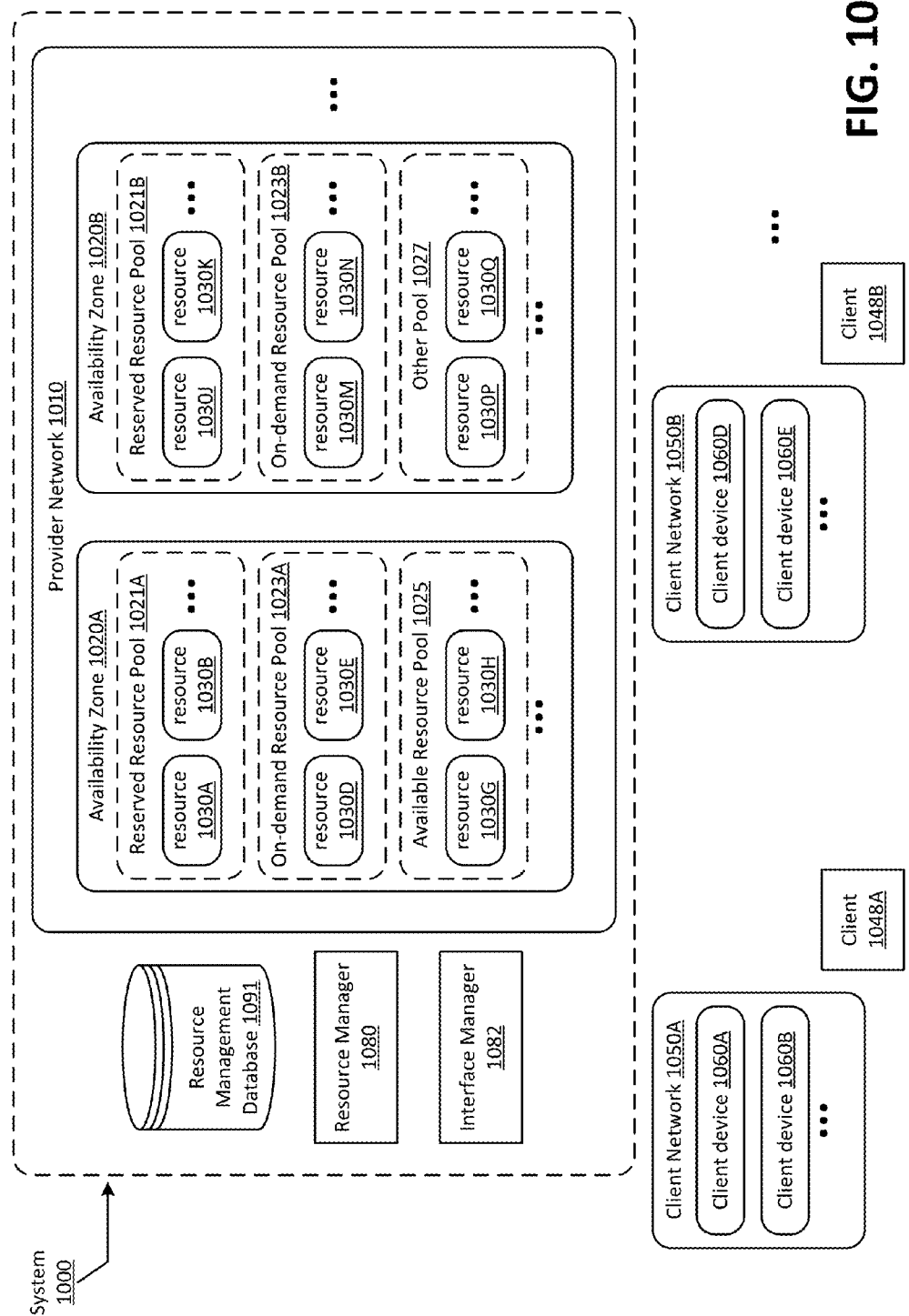
FIG. 10 is a diagram illustrating an example computing system that may be used in some embodiments.

FIG. 10 illustrates an example system environment for providing instances, according to at least some embodiments. The system 1000 may include a provider network 1010 comprising a plurality of resource instances 1030 (which may be referred herein singularly as "a resource instance 1030" or in the plural as "the resource instances 1030"), such as instances 1030A, 1030B, 1030D, 1030E, 1030G, and 1030H in one availability zone 1020A and instances 1030J, 1030K, 1030M, 1030N, 1030P, and 1030Q in a different availability zone 1020B. The various resource instances 1030 in the availability zones 1020A and 1020B (which may be referred herein singularly as "an availability zone 1020" or in the plural as "the availability zones 1020") may be reserved and/or allocated for use by clients (or potential clients), such as client 1048A and 1048B (which may be referred herein singularly as "a client 1048" or in the plural as "the clients 1048"). In the illustrated embodiment, system 1000 includes a resource manager 1080 and an interface manager 1082. As noted earlier, in some embodiments the functionality of the interface manager 1082 may be implemented by a subcomponent of the resource manager 1080.

The interface manager 1082 may in some embodiments implement one or more programmatic interfaces allowing clients 1048 to search for, browse, reserve, and acquire resource instances 1030 to obtain various types of services, e.g., to run and/or access various applications. In the illustrated embodiment, at a given point in time, some or all of the resource instances 1030 may be assigned to instance pools, such as reserved instance pools 1021A or 1021B, on-demand instance pools 1023A or 1023B, available instance pool 1025, or other pools, such as other pool 1027.

In some embodiments a given pool, such as available resource pool 1025, may itself contain its own sub-pools, e.g., based on the modes of instance reservation and allocation supported. Each pool (or sub-pool) may have an associated pricing policy for its instances, as well as other properties, such as interruptibility settings, for the instances that happen to be assigned to the pool or sub-pool. The pools may represent logical collections or aggregations, so that, for example, the presence of two instances in the same pool or sub-pool may not necessarily imply anything about the physical location of the hardware used for the two instances.

Although the resource instances 1030 illustrated in FIG. 10 are shown as belonging to availability zones 1020, in other embodiments the provider network 1010 may be organized differently, e.g., in some embodiments availability zones 1020 may not be implemented. Availability zones 1020 may be grouped into geographic regions (not shown in FIG. 10) in some embodiments. Instance pools may be implemented within availability zones in some implementations (e.g., each availability zone may have its own reserved instance pool); while in other implementations an instance pool or sub-pool may span multiple availability zones.

Figure 11:
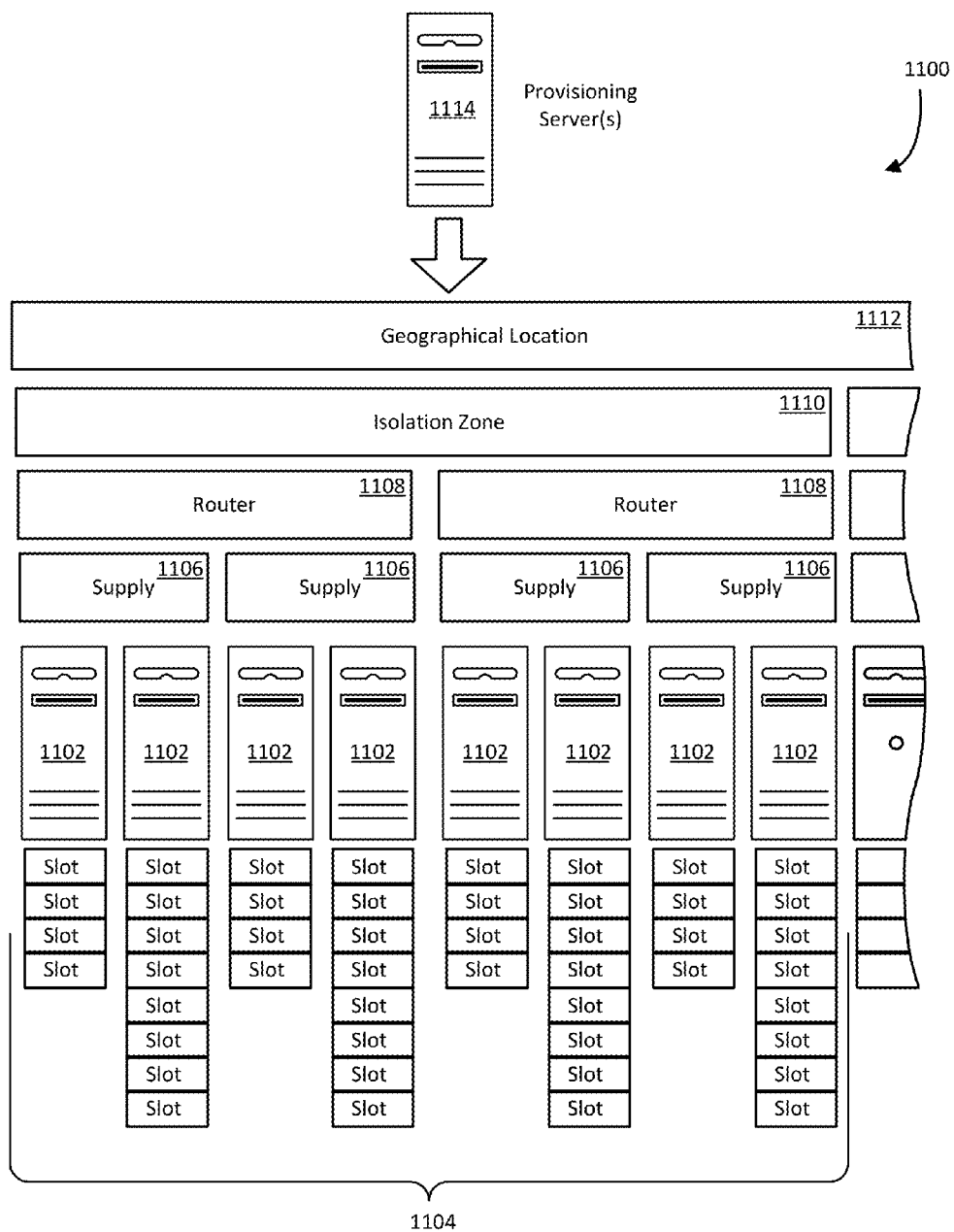
FIG. 11 is a diagram illustrating systems for analyzing a process by data profiling in accordance with the present disclosure.

In some embodiments, such as in FIG. 11, a data center 1100 may be viewed as a collection of shared computing resources and/or shared infrastructure. For example, as shown in FIG. 11, a data center 1100 may include virtual machine slots 1104, physical hosts 1102, power supplies 1106, routers 1108, isolation zone 1110, and geographical location 1112. A virtual machine slot 1104 may be referred to as a slot or as a resource slot. A physical host 1102 may be shared by multiple virtual machine slots 1104, each slot 1104 being capable of hosting a virtual machine, such as a guest domain. Multiple physical hosts 1102 may share a power supply 1106, such as a power supply 1106 provided on a server rack. A router 1108 may service multiple physical hosts 1102 across several power supplies 1106 to route network traffic. An isolation zone 1110 may service many routers 1108, the isolation zone 1110 being a group of computing resources that may be serviced by redundant resources, such as a backup generator. Isolation zone 1110 may reside at a geographical location 1112, such as a data center 1100. A provisioning server 1114 may include a memory and processor configured with instructions to analyze user data and rank available implementation resources using determined roles and shared resources/infrastructure in the calculation. The provisioning server 1114 may also manage workflows for provisioning and deprovisioning computing resources as well as detecting health and/or failure of computing resources.

A provisioning server 1114 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 1102 that shares a router 1108 with a second system may be more proximate to the second system than to a third system only sharing an isolation zone 1110. Depending on an application, it may be desirable to keep the distance low to increase throughput or high to increase durability. In another embodiment, the distance may be defined in terms of unshared resources. For example, two slots 1104 sharing a router 1108 may have a distance of a physical host 1102 and a power supply 1106. Each difference in resources may be weighted differently in a distance calculation.

A placement calculation may also be used when selecting a prepared resource to transfer to a client account. In one embodiment, a client requests a virtual machine having an operating system. The provisioning server 1114 may determine that the request may be satisfied with a staged volume in a slot 1104. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 1114 may determine that a placement near other existing volumes is desirable for latency concerns. Therefore, the decision may find that sharing a router 1108 is desirable but sharing a supply 1106 and physical host 1102 is undesirable. A volume in the pool may then be selected that matches these attributes and placed preferably on a same router 1108 as the other volumes but not the same physical host 1102 or power supply 1106. In other examples of placement decisions, such as those relating to a database shard, sharing of infrastructure may be less desirable and a volume may be selected that has less infrastructure in common with other related volumes.

Figure 12:
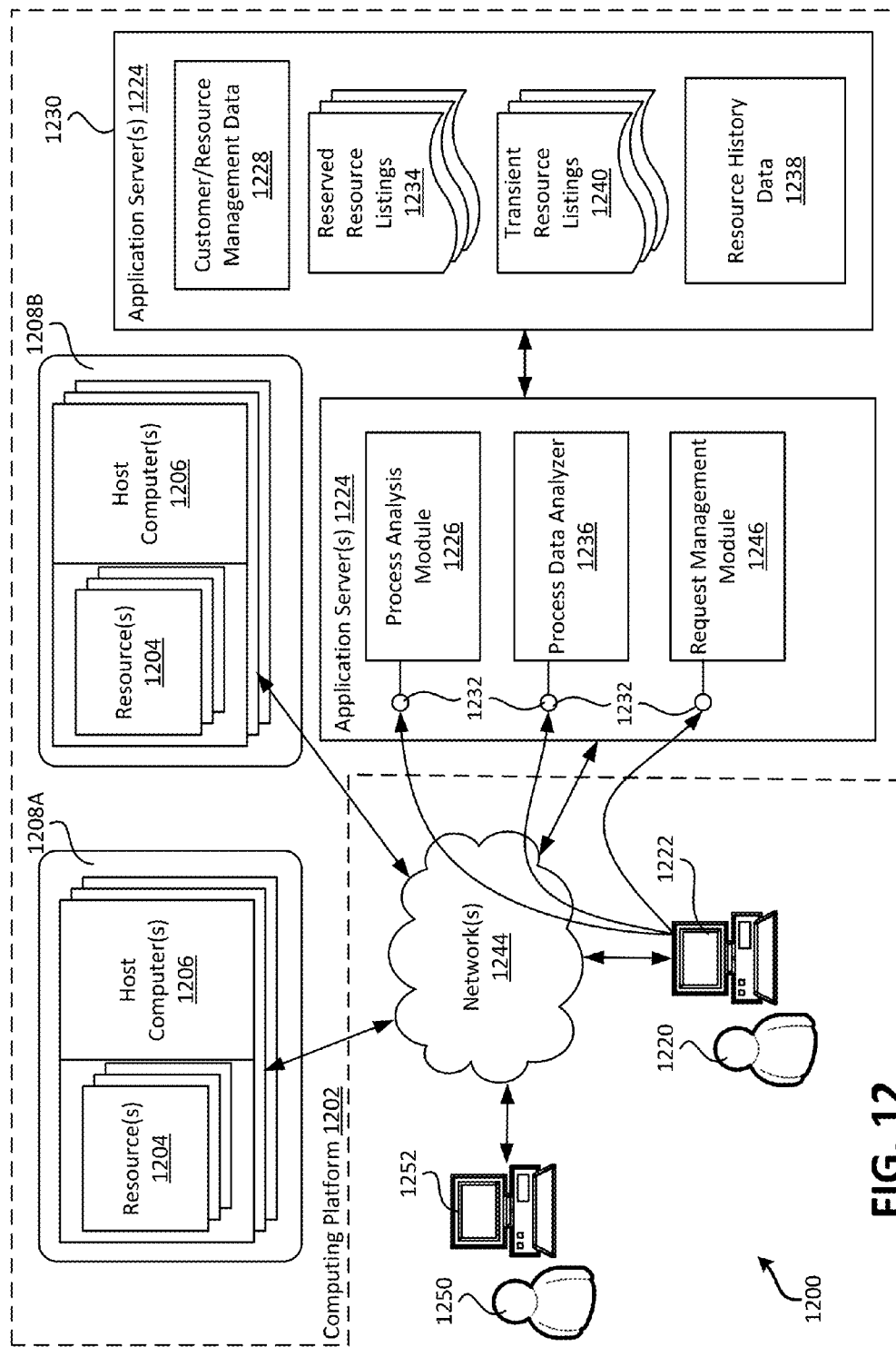
FIG. 12 is a diagram illustrating systems for analyzing a process by data profiling in accordance with the present disclosure.

FIG. 12 is a system diagram that shows an illustrative operating environment 1200 including several components for implementing a process analysis service 180. The environment 1200 may include a computing platform 1202. The computing platform 1202 may be implemented by a computing resource provider to make computing resources available to customers 1220 for the deployment and execution of distributed applications.

The computing resources provided by the computing platform 1202 may include various classes of resources, such as data processing resources, data storage resources, data communication resources, and the like. Each class of computing resource may be general-purpose or may be available in a number of specific configurations. For example, data processing resources provided by the computing resource provider may be made available in discrete units or resources 1204. Each resource 1204 may represent, for example, the data processing resources of a dedicated host computer 1206, referred to as a dedicated tenancy instance, or each resource 1204 may represent a virtual machine instance executing on a host computer 1206, which may also be referred to as a shared tenancy instance.

The host computers 1206 may represent generic multi-processor server devices, special-purpose hardware devices, and the like. As discussed above, various types and configurations of resources 1204 may be made available. For example, each available resource 1204 of data processing resources may be of a particular size—such as small, medium, and large—representing different combinations of physical and/or virtual resources comprising or allocated to the resources, such as number and types of processors, amounts of memory, size and speed of local storage, number of networking addresses or communication channels, and/or the like. A resource 1204 may further be configured with a particular platform, such as a specific OS and/or hypervisor installed on the instance. Resources 1204 may also be made available with specific application software components installed, such as web server software, database management software, portal software, a specific runtime environment or platform, and the like.

Resources may further be available in specific availability zones 1208A and 1208B, as described above. As discussed above, an availability zone 1208 may represent a particular physical location, such as a data center or other physical and/or logical grouping of underlying host computers 1206 and computing devices supporting the resources 1204 provided by the computing platform 1202. Providing resources 1204 in different sizes and in different availability zones 1208 may allow a deployed application to be geographically dispersed, improving end-user performance and insulating the overall application from failures in one particular location or zone. For example, a customer 1220 may choose to deploy a number of small resources 1204 across multiple availability zones 1208 for some functions of the application, such as web servers, while deploying a single, large resource 1204 for other functions, such as a database server, for example. The customer 1220 may also require that resources 1204 be hosted by host computers 1206 in particular geographical locations for geopolitical reasons.

End-users 1250 may utilize end-user computer systems 1252 to access the functionality of the application executing on the allocated instances 1204 through one or more networks 1244. The network(s) 1244 may represent a combination of local-area networks (LANs), wide-area networks (WANs), the Internet, and/or any other networking infrastructure known in the art that connects the host computers 1206 in the computing platform 1202 to the end-user computer systems 1252, to each other and to other computing resources. The end-user computer systems 1252 may represent personal computers (PCs), desktop workstations, laptops, notebooks, personal digital assistants (PDAs), electronic-book readers, game consoles, set-top boxes, consumer electronics devices, server computers, or any other computing device capable of connecting to the network(s) 1244 and communicating with the host computers 1206 in the computing platform 1202.

A customer 1220 wishing to access resources on the computing platform 1202 may similarly utilize a customer computer system 1222 to connect the computing platform over the network(s) 1244 and to configure and manage the computing resources provided by the computing platform. In this regard, the computing platform 1202 may include a number of application servers 1224 that provide various management services to the customer 1220 for purchasing and maintaining resources 1204 of data processing and/or other computing resources, deploying components of the application across the purchased resources 1204, monitoring and administering execution of the application, and the like. As in the case of the end-user computer systems 1252, the customer computer systems 1222 may represent PCs, desktop workstations, laptops, notebooks, PDAs, electronic-book readers, game consoles, set-top boxes, consumer electronics devices, server computers, or any other computing device capable of connecting to the network(s) 1244 and communicating with the application servers 1224 in the computing platform 1202.

The application servers 1224 may represent standard server computers, database servers, web servers, network appliances, desktop computers, other computing devices, and any combination thereof. The application servers 1224 may execute a number of modules in order to provide the management services. The modules may execute on a single application server 1224 or in parallel across multiple application servers in the computing platform 1202. In addition, each module may consist of a number of subcomponents executing on different application servers 1224 or other computing devices in the computing platform 1202. The modules may be implemented as software, hardware, or any combination of the two.

The application servers 1224 may execute a process analysis module 1226. The process analysis module 1226 may be configured to provide notifications to customers 1220 regarding resources 1204 or other computing resources. Resources 1204 may include resources that may be obtained through various modes, such as reserved resources, transient resources, and on-demand resources as described above. Purchased resources 1204 for each customer 1220 and corresponding configuration and status information may be stored in customer/resource management data 1228. The customer/resource management data 1228 may be stored in a database 1230 or other data storage system available to the application server(s) 1224 in the computing platform 1202.

Reserved resources provide the customer with the ability to reserve a number of a specific type and configuration of resources for a term, such as one year or three years. The reserved resources may represent actual instances of data processing resources configured as specified and placed in stand-by for launch and deployment by the customer 1220 at a future time, or the reserved resources 1204 may represent overall capacity reserved by the computing resource provider for quick configuration and launch when required. When deploying an application, a customer 1220 may purchase and launch a number of on-demand resources 1204 of a specific type and configuration (e.g., size, platform, tenancy, availability zone, and the like) to support immediate availability of the application, as well as a number of reserved resources of the same or similar type and configuration for scaling up the application in the future in response to increased demand or capacity requirements of the application, for example.

A customer 1220 may utilize a web browser application executing on the customer computer system 1222 to access a user interface presented by the process analysis module 1226 through a web service to view notifications regarding the customer's purchased resources 1204. The customer 1220 may also utilize a web browser application executing on the customer computer system 1222 to access a user interface presented by the request management module 12412 through a Web service to request actions regarding the customer's resources as discussed above. Additionally or alternatively, the process analysis module 12212 or request management module 1246 may expose an API 1232, which may be accessed over the network(s) 1244 by stand-alone application programs executing on the customer computer system 1222. Other mechanisms for accessing the configuration and maintenance services of the process analysis module 1226 or request management module 1246 may also be imagined, including remote procedure calls, SOAP-based web services, remote file access, proprietary client-server architectures, and the like.

The process data analyzer 1236 may access data and interact with services to determine when transitions for the customer's resources are to be scheduled. The application servers 1224 may execute a request management module 1246. The request management module 1246 may facilitate the fulfillment of the customer's requests based on notifications of scheduled transitions. The request management module 1246 may also allow customer 1220 to view the status of the customer's resources and requests. The customer 1220 may utilize a web browser application executing on the customer computer system 1222 to access a user interface presented by the request management module 1246 through a web service to browse for pending requests and make changes. Additionally or alternatively, the request management module 1246 may expose an API 1232, which may be accessed over the network(s) 1244 by stand-alone application programs executing on the customer computer system 1222.

The request management module 1246 may further store data records regarding submitted and fulfilled requests in the resource history data 1238 in the database 1230 or other data storage system. The resource history data 1238 may be utilized by customer 1220 or the computing resource provider to record billing data regarding fulfilled requests.

As discussed, the user can be provided a user interface for requesting processes and receiving status of requested processes. In one embodiment, a customer may utilize a user interface presented by the request management module 1246 of FIG. 12 to view notifications regarding processes and provide requests for actions and permissions to proceed with the transitions.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for managing computing resources of a provider network, the system comprising:
   one or more computing devices;
   at least one memory having stored therein computer instructions that, upon execution by the system, at least cause the system to:
   receive a request for instantiation of a virtual machine instance on one of the one or more computing devices, the one virtual machine instance associated with a customer of the provider network;
   in response to the request, initiate a process to instantiate the requested virtual machine instance;
   during execution of the process, monitor data associated with initialization of the requested virtual machine instance to a predetermined operational state of the requested virtual machine instance, the data including one or more of CPU cycles per unit time, data written and read per unit time, and input/output operations per unit time;
   determine an expected profile of the monitored data during the initialization, the expected profile determined based at least in part on the requested virtual machine instance; and
   based on a comparison between the monitored data and the expected profile, make a determination pertaining to progress of the initialization of the requested virtual machine instance and a determination of success or failure of the process to instantiate the requested virtual machine instance.

2. The system according to claim 1, further comprising computer instructions that, upon execution by the system, at least cause the system to generate a status message indicative of progress toward the predetermined operational state.

3. The system according to claim 1, further comprising computer instructions that, upon execution by the system, at least cause the system to terminate the initialization based on the failure.

4. The system according to claim 1, further comprising computer instructions that, upon execution by the system, at least cause the system to determine a probable cause for the failure.

5. A method for managing computing resources by a provider network, the method comprising:
   in response to a request for a process of a computing resource of the provider network, initiating the requested process;
   during execution of the process, monitoring data associated with the process of the computing resource;
   determining an expected profile of the monitored data during execution of the process, the expected profile determined based at least in part on the computing resource; and
   based on a comparison between the monitored data and the expected profile, making a determination as to progress of the process of the computing resource and a determination of success or failure of the process of the computing resource.

6. The method of claim 5, wherein information pertaining to the progress of the process is provided via an application programming interface (API) configured to receive data indicative of an identifier for the computing resource and send data indicative of the progress.

7. The method of claim 5, wherein the computing resource is instantiated on one or more computing devices of the provider network.

8. The method of claim 5, wherein the computing resource is a virtual machine instance.

9. The method of claim 5, wherein the monitored data includes data that is observable externally of the process.

10. The method of claim 5, wherein the monitored data comprises one or more of input/output operations per unit time and amount of data received per unit time.

11. The method of claim 10, further comprising redirecting, cancelling, or extending the process in response to the one or more inputs.

12. The method of claim 5, further comprising in response to the determination as to progress, redirecting, cancelling, duplicating, or reinitializing the process.

13. The method of claim 5, wherein the requested process is a termination of the computing resource.

14. The method of claim 5, wherein the requested process is an initialization of the computing resource.

15. The method of claim 5, wherein the requested process is an intermediate process of the computing resource.

16. The method of claim 5, wherein the determination as to progress includes determination of a useful state of the computing resource.

17. A non-transitory computer-readable storage medium having stored thereon computer-readable instructions that, upon execution on one or more computing devices, at least cause:
   initiating a process associated with a computing resource of a provider network;
   during execution of the process, monitoring externally observable data associated with the process;
   determining an expected profile of the monitoring externally observable data during execution of the process, the expected profile determined based at least in part on the computing resource; and
   based on a comparison between the monitored data and the expected profile, making a determination as to progress of the process and a determination of success or failure of the process.

18. The non-transitory computer-readable medium of claim 17, further comprising computer-readable instructions that, when executed by one or more processors of a computer system, cause the computer system to at least implement:
   a programming interface sub-system configured to:
      receive first electronic messages that encode identifiers indicative of requests to provide notification pertaining to the progress; and
      in response to receiving one of the electronic messages, sending second electronic messages indicative of information pertaining to a current status of the progress.

* * * * *